April 21, 1925.
L. W. BOLEY ET AL
COOKING AND SERVING UTENSIL
Filed Dec. 1, 1924
1,534,202
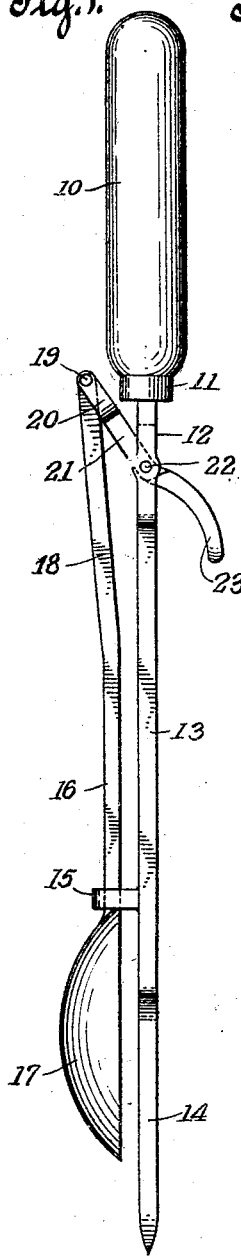
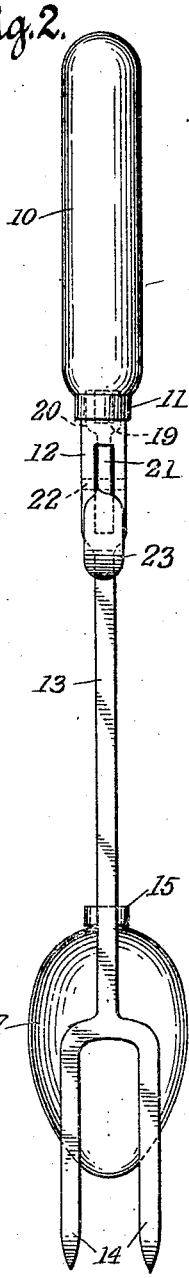
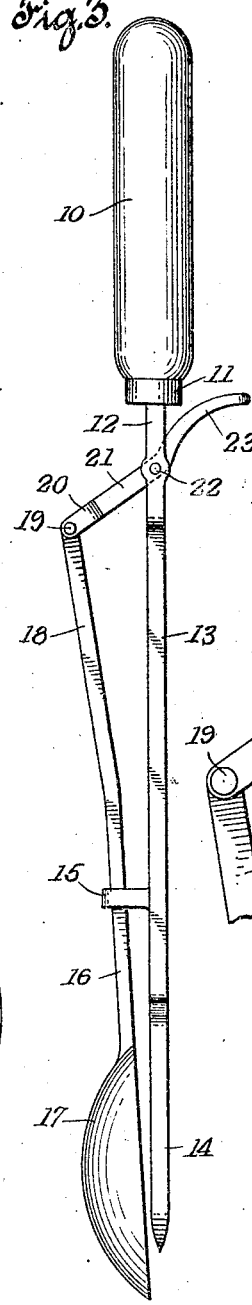
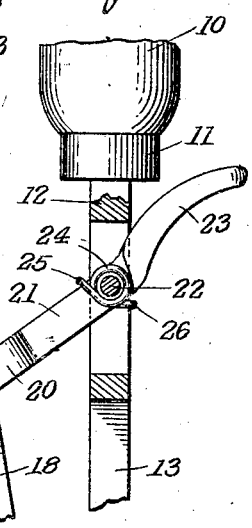
INVENTORS
Leonard W. Boley
Jacob S. Brenner
BY
Percy Freeman
ATTORNEY Patented Apr. 21, 1925.

1,534,202

UNITED STATES PATENT OFFICE.

LEONARD W. BOLEY AND JACOB S. BRENNER, OF NEW YORK, N. Y.

COOKING AND SERVING UTENSIL.

Application filed December 1, 1924. Serial No. 753,051.

*To all whom it may concern:*

Be it known that we, LEONARD W. BOLEY and JACOB S. BRENNER, both citizens of the United States, and residents of New York, in the county of Kings and State of New York, have invented certain new and useful Improvements in Cooking and Serving Utensils, of which the following is a specification.

This invention relates to utensils for serving foods, such as meats, game, fish and vegetables, when cooked and before being carved or cut into individual portions.

One of the objects is in the provision of a conveniently operated appliance having prongs to firmly engage in the food article and from which the prongs may be removed by maneuvering the fingers of the hand in which the utensil is grasped.

Another feature is to provide a spoon shaped member, associated with the shank of the pronger element, that is well adapted for use in basting the food article or in serving gravy therefrom, either the spoon or form being utilized selectively, only one hand being needed for the purpose.

It is a further aim to produce an implement in which a spoon and fork are so combined that either may be used without interference of the other, and in which the spoon is normally extended beyond the prongs or tines of the fork.

These and other analogous features are accomplished by the novel design, construction and arrangement of parts hereinafter described in detail and shown in the accompanying drawing, constituting a material part of this disclosure, and in which :—

Figure 1 is a side elevational view of an embodiment of the invention, the spoon being shown in a retracted position.

Figure 2 is a front elevational view of the same.

Figure 3 is a view similar to Fig. 1, but showing the spoon as extended beyond the fork prongs.

Figure 4 is a fragmentary side view of the spoon actuating lever as pivoted to the handled shank of the fork, parts being broken away and the drawing made to an enlarged scale to show a modified form.

A conventional type of handle is designated by the numeral 10, the same being of such shape as to be comfortably and securely grasped by the hand of an operator, and of any preferred cross section.

Fixed on the end of the handle is a ferrule 11 and firmly secured in the ferruled end of the handle is the bifurcated end 12 on a rigid bar 13 constituting the straight shank of a fork having two or more sharply pointed, spaced prongs 14 adapted to pierce the food article in manipulating the same.

On one side of the shank 13, relatively near the fork and extending at a right angle from its flat side, is a rigid loop or eye 15 acting as a guide to slidably receive a stem 16 integral with the bowl of a spoon 17 so held that its edges are maintained in spaced parallel relation to the flat prongs 14 of the fork when the spoon is in a retracted position.

The opposite portion of the stem is bent angularly outward as at 18 and connected by a pivot pin 19 within the fork 20 of a lever 21 which is fulcrumed on a pin 22 passing between the sides of the fork 12 adjacent the handle 10.

The free opposite end of the lever, protruding from the other side of the shank 13, is increased in width and shaped to produce a convenient, trigger-like finger hold 23.

If it is deemed desirable to have the spoon normally protrude past the fork prongs, as shown in the modification in Fig. 3, a torsional spring 24 is coiled around the pivot pin 22, one of the ends 25 of the spring being bent to engage over the lever 21 and the other end 26 similarly bent to engage the shank of the fork 13 on the opposite side, the action of the spring tending to hold the parts as shown in Fig. 4.

From the foregoing, it will be seen that the spoon 17 may be moved relatively to the fork 14 by actuating the finger hold or trigger 23, in an easy and positive manner.

Thus the spoon may be used for the purpose of basting or the like without interference by the fork, or the fork may be entered into the food article at will and thereafter forcibly withdrawn by actuation of the lever 21, to press the point of the spoon against the article to force it off the tines.

In the modification shown in Fig. 4, the food article would be forced from the fork upon release of the finger grip 23, through the agency of the spring 24.

Obviously, the device may conveniently be used by one armed unfortunates, as an implement of table ware.

From the foregoing, it will be seen that a simple device for the purposes stated has been disclosed in the preferred forms of its embodiment, but it is not desired to restrict the details to the exact construction shown, it being obvious that changes, not involving the exercise of invention may be made without conflicting with the scope of the appended claims.

Having thus described our invention, what we claim as new and desire to secure by Letters Patent, is:—

1. A serving utensil comprising a plurally pronged fork having a straight shank bifurcated at its opposite end, a handle fixed on the bifurcated end, an eye rigid on said shank, a spoon having a stem slidable in said eye, a finger lever fulcrumed on the bifurcated portion of said shank, and a pivotal connection between the lever and said stem.

2. A serving utensil comprising a plurally pronged fork having a straight shank, a handle therefor, a spoon disposed to present its edges adjacent the prongs of the fork, said spoon having a stem, means on said shank to support and guide the stem, and a lever pivotally carried by said shank adjacent the handle to actuate said stem to move the spoon relatively to the prongs of the fork.

3. A serving utensil comprising a plurally pronged fork having a straight shank bifurcated at its opposite end, a handle free of impediments to be grasped by an operator's hand and into which the bifurcated shank is secured, a rigid guide loop on said shank adjacent the prongs of the fork and at a right angle to the plane thereof, a spoon having its concave side adjacent the side surface of the prongs, a stem formed on said spoon slidably engaged in the loop, the outer portion of said stem being bent outwardly, a finger operable lever fulcrumed in the bifurcation of said shank to extend adjacent the handle, and a fork on the opposite end of said lever pivoted to the extremity of the spoon stem.

4. A serving utensil comprising a plurally pronged fork having a straight shank, a handle fixed on said shank, a spoon disposed adjacent the flat surfaces of the fork, an eye through which the stem is freely slidable, said eye being fixed on said shank, a lever carried by said shank and pivoted to said stem, and a spring associated with said lever whereby said spoon is normally extended past the prongs of the fork.

5. A serving utensil comprising in combination, a plurally pronged fork having a straight shank, a handle fixed to said shank, a spoon slidably disposed adjacent the flat surfaces of the fork, and resilient means adapted normally to project the spoon relative to the fork.

Signed at New York, in the county of New York and State of New York, this 22nd day of November, 1924.

LEONARD W. BOLEY.
JACOB S. BRENNER.